United States Patent [19]

Easter

[11] Patent Number: 4,793,042
[45] Date of Patent: Dec. 27, 1988

[54] ROLLING MILL ROLL ASSEMBLY

[75] Inventor: Holton C. Easter, Michigan City, Ind.

[73] Assignee: Inland Steel Company, Chicago, Ill.

[21] Appl. No.: 533,240

[22] Filed: Sep. 19, 1983

[51] Int. Cl.$^4$ .......................... B21K 1/02; B21B 27/00
[52] U.S. Cl. .............................. 29/148.4 D; 29/130; 29/132; 29/447; 29/DIG. 35; 156/144; 156/294
[58] Field of Search .................. 29/130, 132, 148.4 D, 29/447, DIG. 35, 129, 127, 125; 156/294, 144, 172, 292

[56] References Cited

U.S. PATENT DOCUMENTS

| | | | |
|---|---|---|---|
| 113,140 | 3/1871 | Caswell | 29/127 |
| 2,964,251 | 9/1956 | Samuels et al. | 241/293 |
| 3,688,369 | 9/1972 | Turner et al. | 29/129 X |
| 3,718,956 | 3/1973 | Sekimoto et al. | 29/132 |
| 4,015,320 | 5/1977 | Meckel et al. | 29/130 |
| 4,250,605 | 2/1981 | Chapman | 29/132 |

OTHER PUBLICATIONS

"Walzenkleben mit Gupalon 20", Gussolit-Verbindungstechnik, Munich, West Germany.

Primary Examiner—Mark Rosenbaum
Attorney, Agent, or Firm—Marshall, O'Toole, Gerstein, Murray & Bicknell

[57] ABSTRACT

A rolling mill roll assembly comprising an inner cylindrical mandrel and an outer cylindrical sleeve bonded thereto with glue containing grit particles. Wire is spirally wound around the outside of the mandrel and secured thereto with the glue. The sleeve has an inner diameter substantially equal to the outer diameter of the mandrel plus two times the wire thickness. The grit particles are thicker than the wire. The sleeve is heated to thermally expand the sleeve sufficiently to clear the grit particles when slipped over the mandrel. As the sleeve cools, the wire acts to center the sleeve on the mandrel, and the grit particles, which are harder than both the sleeve interior and the mandrel exterior become embedded in both to enhance the glue bond. The sleeve is substantially devoid of hoop stresses.

31 Claims, 1 Drawing Sheet

U.S. Patent        Dec. 27, 1988        4,793,042
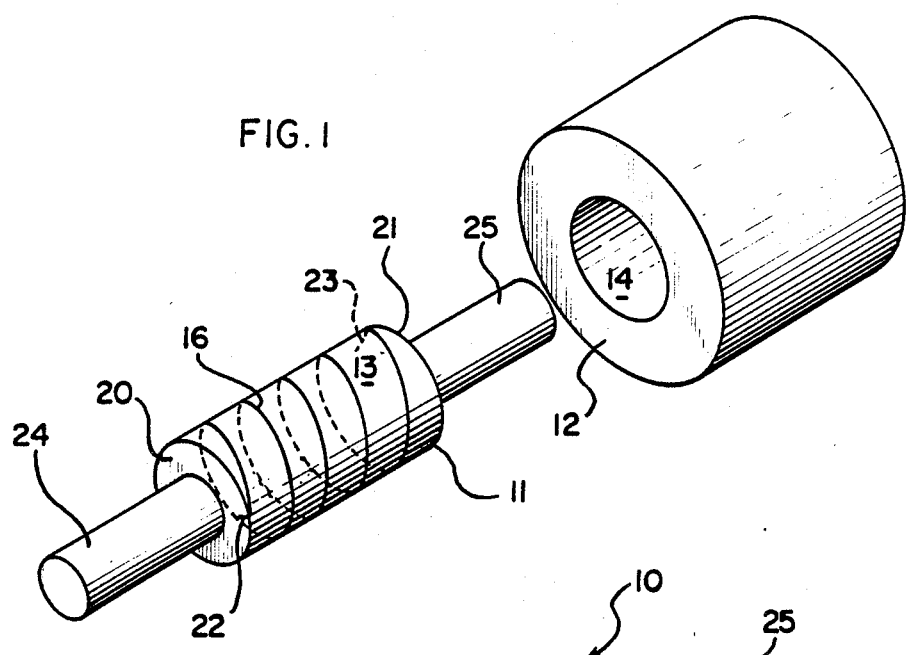
FIG. 1
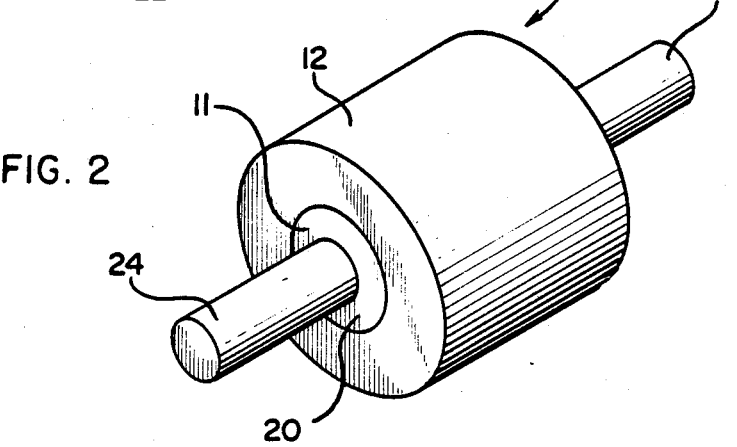
FIG. 2
FIG. 3
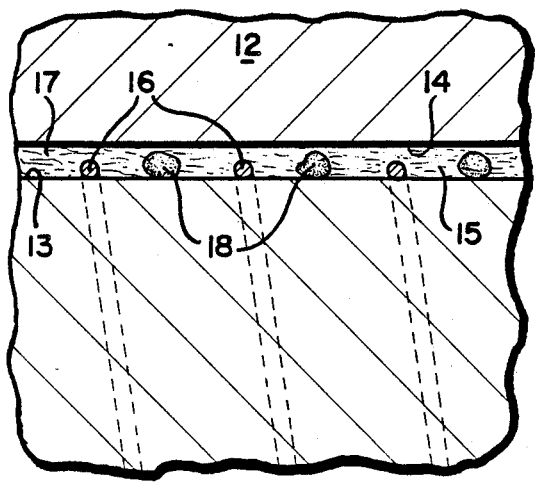
FIG. 4
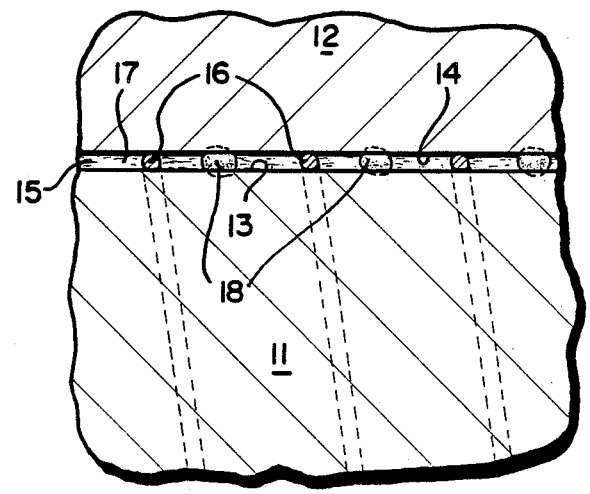

ROLLING MILL ROLL ASSEMBLY

BACKGROUND OF THE INVENTION

The present invention relates generally to a rolling mill roll assembly and more particularly to an assembly of this type having a removable outer sleeve shrink-mounted on an inner mandrel.

A rolling mill roll assembly is typically utilized in the rolling of metals such as steel. Such an assembly may comprise a cylindrical inner mandrel upon which is shrink-mounted a cylindrical outer sleeve. Examples of a rolling mill assembly of this type and of the procedure for shrink mounting or fitting the sleeve on the mandrel are disclosed in Samuels, et al. U.S. Pat. No. 2,964,251, and the disclosure thereof is incorporated herein by reference.

In a shrink mounting procedure of the type described in the Samuels et al. patent, the sleeve is initially provided with an inner diameter slightly smaller than the outer diameter of the mandrel. The sleeve is then heated to thermally expand the inner diameter to a dimension greater than that of the outer diameter of the mandrel following which the sleeve is slipped around the mandrel, or the mandrel is inserted into the sleeve, and the sleeve is allowed to cool thereby causing it to contract or shrink to tightly bind the sleeve onto the mandrel. Because, in a cooled condition, the sleeve has an inner diameter slightly smaller than the outer diameter of the mandrel, shrink fitting of the sleeve around the mandrel in the manner described above will cause hoop stresses in the sleeve, and that is undesirable.

Recently, it has been proposed to bind the sleeve to the mandrel with an adhesive or glue. In such an approach, the sleeve could be provided with an initial inner diameter which is essentially the same as the outside diameter of the mandrel. To facilitate fitting this sleeve on the mandrel, the sleeve is heated to thermally expand its inside diameter following which it is slipped around the mandrel which has been coated with adhesive, and the sleeve is allowed to cool thereby causing it to contract and become bound to the mandrel through the medium of the adhesive. This approach probably avoids the hoop stresses which occur when the sleeve is bound to the mandrel by shrink fitting, but it creates other problems. These include centering the sleeve around the mandrel as the sleeve undergoes contraction during cooling, and preventing the adhesive from being squeezed out from between the sleeve and the mandrel during contraction of the sleeve.

SUMMARY OF THE INVENTION

The present invention relates to a rolling mill roll assembly, and to a method for producing same, which avoids the aforementioned prior art problems.

In accordance with the present invention, there is provided, in addition to the cylindrical mandrel and tubular sleeve, a metal wire having a predetermined thickness. The wire is wrapped around the exterior surface of the mandrel and secured to the mandrel by glue which is applied to the mandrel's exterior surface.

The cylindrical metal sleeve has a predetermined inner diameter which, at ambient temperature, is substantially equal to the outer diameter of the mandrel plus two times the thickness of the wire. The sleeve is heated to thermally expand its inner diameter following which the heated, expanded sleeve is slipped over the glue-coated mandrel around which the wire has been previously wound. The sleeve is then cooled to contract the sleeve to its ambient inner diameter. The wire is interposed between the mandrel and the sleeve, and acts to center the sleeve about the mandrel, as the sleeve undergoes contraction during cooling. The contracted sleeve is adhered to the mandrel and the wire by the glue.

Because the sleeve has, at ambient temperature, a predetermined inner diameter substantially equal to the outer diameter of the mandrel plus two times the thickness of the wire, there is a substantial avoidance of hoop stresses in the sleeve due to the mandrel or the wire during contracting of the sleeve from its thermally expanded diameter.

The wire acts as a dam for the glue, and retains a desired amount of the glue in the space between the inner surface of the sleeve and the outer surface of the mandrel, during contraction of the sleeve.

Grit particles are mixed with the glue applied on the mandrel. These grit particles have a cross-sectional dimension greater than the thickness of the wire. The sleeve is thermally expanded during the heating so that it will clear the grit particles when the sleeve is slipped over the mandrel. The grit particles are harder than either (a) the interior surface of the sleeve or (b) the exterior surface of the mandrel. Accordingly, as the sleeve contracts to its normal inner diameter during cooling, at least some of the grit particles are partially embedded in at least one of (a) the interior of the sleeve or (b) the exterior of the mandrel. This enhances the bond between the sleeve and the mandrel.

Although a slight hoop stress is created by the grit particles, this is relatively insubstantial compared to the hoop stress which could occur in a situation where the inner diameter of the sleeve, at ambient temperature, is less than the outer diameter of the mandrel.

Other features and advantages are inherent in the structure and method claimed and disclosed or will become apparent to those skilled in the art from the following detailed description in conjunction with the accompanying diagrammatic drawing.

BRIEF DESCRIPTION OF THE DRAWING

FIG. 1 is a perspective illustrating an embodiment of a rolling mill roll assembly in accordance with the present invention, in a disassembled condition;

FIG. 2 is a perspective of the rolling mill roll assembly in an assembled condition;

FIG. 3 is an enlarged, fragmentary sectional view of the assembly with the sleeve in a thermally expanded condition; and FIG. 4 is a view similar to FIG. 3 with the sleeve in its contracted condition.

DETAILED DESCRIPTION

Referring initially to FIGS. 1–2, indicated generally at 10 is a rolling mill roll assembly constructed in accordance with the present invention. Assembly 10 comprises a cylindrical, metal mandrel 11 having an exterior surface 13 and axle portions 24, 25. Assembly 10 also comprises a cylindrical metal sleeve 12 having an interior surface 14. As shown in FIGS. 1 and 4, a metal wire 16 is disposed around exterior surface 13 of mandrel 11, and the wire is sandwiched between the mandrel's exterior surface 13 and the sleeve's interior surface 14. There is a space 15 between mandrel exterior surface 13 and sleeve interior surface 14. The dimension of space 15, in a radial direction, corresponds to the thickness of wire 16 (FIG. 4). Also located in space 15 is a glue or adhesive 17 for adhering together sleeve 12, mandrel 11, and wire 15.

Mixed with glue 17 are grit particles 18, 18 (FIGS. 3-4). At least some of these grit particles have a hardness exceeding the hardness of at least one of (a) the interior of sleeve 12 or (b) the exterior of mandrel 11. Preferably, the grit particles are harder than either (a) the sleeve interior or (b)the mandrel exterior.

At least some of the grit particles have a cross-sectional dimension exceeding the thickness of wire 16, and preferably all of the grit particles exceed the thickness of the wire.

As shown in FIG. 4, at least some of the grit particles 18, 18 are partially embedded in at least one of (a) the interior of sleeve 12 or (b) the exterior of mandrel 11. Preferably, the grit particles are embedded in both the sleeve interior and the mandrel exterior to enhance the bond therebetween effected by glue 17.

Wire 16 acts as a dam for glue 17 in space 15, and the wire retains a desired amount of glue in that space.

As shown in FIG. 1, wire 16 preferably is spirally wound around the mandrel's exterior surface 13. The cylindrical mandrel has a pair of opposed ends 20, 21, and the spirally wound wire has a pair of ends 22, 23, each of which is adhered to a respective cylinder end 20, 21 by the glue. Similarly, the convolutions or windings of spirally-wound wire 16 are adhered to the mandrel's exterior surface 13 by the glue. As shown in the drawings, the spacing between adjacent convolutions of the wire is substantially greater than the thickness of the wire, and the wire is separate and discrete from and non-integral with the mandrel.

Sleeve 12 is assembled onto mandrel 11, employing a procedure in accordance with an embodiment of the present invention, as described below.

Preferably, as a preliminary operation, both exterior mandrel surface 13 and interior sleeve surface 14 are roughened, as by shot blasting, knurling, grooving or similar procedures, to enhance the adherence of glue 17 to each. Typically each of surfaces 13 and 14 has a roughness expressed, in conventional terms, as a 300-500 Ra. (average roughness) finish or a V 300-500 micro-inch (7.6-12.7 mm) finish which means that, in the case of the sleeve, for example, the finish is held within 300-500 micro-inches on the bore of the sleeve.

Initially, wire 16 is spirally-wound around the mandrel's exterior surface 13 and secured thereto with glue which is applied around the exterior surface of the mandrel which has been cleaned, roughened and degreased. At the same time, the wire ends 22, 23 may be secured with glue to the mandrel ends 20, 21 respectively.

Sleeve 12 has an inner diameter which, at ambient temperature, is substantially equal to the outer diameter of mandrel 11 plus two times the thickness of wire 16. The sleeve interior surface is cleaned, roughened and degreased, like the mandrel exterior surface. The sleeve is then heated to thermally expand its inner diameter following which the heated, expanded sleeve is slipped over mandrel 11 around which wire 16 has been wound and onto which glue 17 has been applied. Alternatively, mandrel 11 may be inserted within sleeve 12.

Referring to FIG. 3, the sleeve is composed of a metal having a predetermined coefficient of expansion which permits the sleeve to thermally expand during heating until the inside diameter of the sleeve exceeds the outside diameter of the mandrel plus two times the thickness of wire 16, and this facilitates mounting the sleeve on mandrel 11 when the wire is wound around the mandrel. As noted above, the glue contains grit particles 18, 18 which have a cross-sectional dimension greater than the thickness of wire 16. Therefore, sleeve 12 is heated to a temperature, e.g. 575° F. (302° C.), which will thermally expand the sleeve sufficiently to enable it to clear the grit particles when the thermally expanded sleeve is mounted on mandrel 11. When the sleeve is in its thermally expanded condition and is mounted on the mandrel, the gap between sleeve interior surface 14 and mandrel exterior surface 13 exceeds the thickness of wire 16, interposed between the sleeve and the mandrel, and exceeds the cross-sectional dimension of grit particles 18, 18.

After the heated sleeve has been mounted on the mandrel, the sleeve is allowed to cool, thereby contracting the sleeve interior to its ambient diameter. Wire 16, which is interposed between the mandrel and the sleeve during the cooling of the sleeve, centers the sleeve about the mandrel as the sleeve undergoes contraction during cooling.

As sleeve 12 shrinks during cooling, from the expanded condition shown in FIG. 3 to the contracted condition shown in FIG. 4, space 15 contracts and grit particles 18, 18 become embedded in at least one of and preferably both of (a) the interior of sleeve 12 and (b) the exterior of mandrel 11. Because the grit particles are embedded in both the mandrel exterior and the sleeve interior, they create, together with glue 17, a bond which resists the normal torque rolling loads experienced in a rolling mill.

During cooling and contraction of space 15, the convolutions or windings of wire 16 act as a dam to retain a desired amount of glue 17 within space 15.

Because the sleeve has an inner diameter equal to the outside diameter of the mandrel plus two times the thickness of wire 16, at ambient temperature, sleeve 12 does not acquire hoop stresses due to the mandrel or the wire, as it shrinks from its expanded to its contracted condition. The only hoop stresses present in the contracted sleeve are those incurred as a result of the partial embedment of grit particles 18, 18 in the interior of sleeve 12, and these hoop stresses are relatively insubstantial.

In a typical embodiment of the present invention, wire 16 has a diameter of about 0.041 in. (1.04 mm) (19 gauge), and the inner diameter of sleeve 12 is about 0.080 in. (2.03 mm) greater than the outer diameter of mandrel 11, which is e.g., 17.250 in. (43.815 cm). This provides a clearance of about 0.040 in. (1.01 mm) between the exterior surface of the mandrel and the interior surface of the sleeve, at space 15. Therefore, there is a 0.001 in. (0.025 mm) differential between (a) the thickness of wire 16 and (b) the difference between the outside diameter of mandrel 11 and the inside diameter of sleeve 12. As a result, upon contraction of the sleeve, there will be either a very slight flattening of wire 16, if the wire is softer than the interior of the sleeve, or a very slight hoop stress produced in the sleeve if the wire is harder than the interior of the sleeve. However, such a hoop stress, if present at all, would be very insubstantial. Preferably, the wire is softer than the sleeve interior. In another example, the mandrel has an outer diameter of 19.357 in. (49.167 cm) and the sleeve has an inner diameter of 19.437 in. (49.370 cm) with a radial clearance of 0.040 in. (1.01 mm) between the sleeve and the mandrel on each side.

As noted above, the interior of sleeve 12 is relatively soft compared to the hardness of grit particles 1,, 18. However, because the sleeve is employed in the rolling of metal such as steel, it is desirable that the exterior of the sleeve be relatively hard, substantially harder than the interior of the sleeve. A sleeve having these dual hardness characteristics can be produced by utilizing a double casting procedure, or by heat treating, or both; and both of these procedures are conventional and have been long employed in the production of rolling mill roll sleeves. Such procedures are described in the aforementioned Samuels et al. U.S. Pat. No. 2,964,251, and the description therein of such procedures is incorporated herein by reference. The soft material around the interior of the sleeve is usually about 0.25 in. deep (6.35 mm) out of a total sleeve thickness of 4 in. (101.6 mm), for example.

The sleeve may have a composition typical of those heretofore used for rolling mill roll sleeves, consistent with the considerations discussed above regarding interior hardness, thermal expansion properties, etc. Thermal expansion is a function of composition, and hardness is a function of composition or heat treating or both; and both considerations are well within the skill of the roll-making art. The employment of a sleeve enables the utilization of materials for the sleeve not traditionally contemplated as material for a rolling mill roll due to difficulties in casting a whole roll or in machining a roll of that material. Casting a sleeve is less difficult than casting a whole roll. In addition, when cast as a sleeve rather than as a whole roll, the hardness can be better controlled.

Examples of sleeve compositions and of the exterior and interior hardness of such sleeves are set forth below. The sleeve's interior is soft grey iron having a hardness of 30–45 Shore C. The sleeve's exterior is nickel indefinite chill iron at various hardnesses up to 84 Shore C, or higher. Other sleeve exterior compositions include Cr-Mo steel and 7 wt. % vanadium iron.

Wire 16 is composed of a relatively soft, mild steel, which is preferably softer than the sleeve's interior which, as noted above, has a hardness in the range 30–45 Shore C.

Mandrel 11 is composed of steel and has a relatively soft exterior, compared to the hardness of grit particles 18, 18. The mandrel may have a composition typical of those heretofore utilized for rolling mill roll mandrels, consistent with the considerations discussed above regarding exterior hardness. Exterior hardness is a function of composition or heat treatment or both and is well within the skill of the roll-making art. Examples of mandrel composition and hardness are set forth below. The mandrel may be composed of nickel indefinite chill iron or a Cr-Mo steel containing 2.0–2.1 wt. % carbon or an ASTM 4140 forged steel. The mandrel's exterior hardness matches the sleeve's interior hardness, e.g. 30–45 Shore C. The mandrel may be made from a worn or used one-piece rolling mill roll which has had its exterior machined down to receive a sleeve.

Grip particles 18, 18 are typically composed of steel and have a hardness (e.g., 62–67 Rockwell C) greater steel and have a hardness (e.g., 6214 67 Rockwell C) greater than that of the mandrel exterior and the sleeve interior. A material other than steel may be employed for the grit so long as the grit particles have the hardness requirements noted above.

The glue may be a two component, high temperature glue comprising a base and a reactor composed of epoxy resin modified with silicones. Such glue is prepared by thoroughly mixing two parts base and one part reactor, by volume, to produce a mixture having a specific weight of 1.10.

The glue should possess adhesive properties at elevated temperature slightly below that to which the sleeve is heated incident to assembly, but should not be adhesive at the assembly temperature so as to permit disassembly of a worn sleeve for replacement by heating the roll assembly to that temperature. For example, if the sleeve must be heated to a temperature of 575° F. (302° C.) to expand the sleeve sufficiently to fit it over the mandrel/wire/glue-grit subassembly then the glue should have adhesive properties at about 500° F. (260° C.), but not substantially above. This permits a worn sleeve to become loosened from the glue by heating the sleeve to 575° F. (302° C.).

Once the two components of the glue have been thoroughly mixed, the glue has a working time of about 90 minutes. The glue has a setting time of about 5 hours at 68° F. (20° C.) and fully hardens in 24 hours to a shearing-tensile strength of about 294.2 N/mm$^2$ (426 ksi).

A commercially available glue of the type which may be employed in accordance with the present invention is Gupalon Type 20 THIX produced by Gussolit Verbindungstechnik, of Munich, West Germany.

In accordance with the present invention, the glue described above is mixed with steel grit having a size in the range 0.050–0.070 in. (1.27–1.78 mm) when space 15 corresponds to a wire thickness of 0.041 in. (1.04 mm). The grit constitutes about 20–50 vol. % of the glue plus grit mixture.

The foregoing detailed description has been given for clearness of understanding only, and no unnecessary limitations should be understood therefrom, as modifications will be obvious to those skilled in the art.

I claim:

1. A rolling mill roll assembly for rolling metals, said assembly comprising:
   a cylindrical, metal mandrel having an exterior surface;
   a cylindrical, metal sleeve disposed around said mandrel;
   metal wire disposed around said exterior surface of said mandrel and sandwiched between the latter and said interior surface of said sleeve;
   said metal wire comprising means for centering sadd sleeve about said mandrel;
   a space between the exterior surface of the mandrel and the interior surface of the sleeve;
   the dimension of said space, in a radial direction, corresponding to the thickness of said wire;
   said sleeve being shrink fitted on said wire;
   and glue means in said space for adhering together said sleeve, said mandrel and said wire;
   said wire comprising dam means for the glue means in said space.

2. An assembly as recited in claim 1 and comprising:
   grit particles mixed with said glue means;
   at least some of said grit particles having a hardness exceeding the hardness of at least one of (a) said interior surface of said sleeve and (b) said exterior surface of said mandrel;
   and at least some of said grit particles having a cross sectional dimension exceeding the thickness of said wire.

3. An assembly as recited in claim 2 wherein:

at least some of said grit particles are partially embedded in at least one of (a) the interior of said sleeve and (b) the exterior of said mandrel.

4. An assembly as recited in claim 3 wherein:
at least some of said grit particles are embedded in both the interior of the sleeve and the exterior of the mandrel to enhance the bond therebetween effected by the glue means.

5. An assembly as recited in claim 3 wherein:
said sleeve is devoid of hoop stresses except those incurred as a result of the partial embedment of said grit particles in the interior of the sleeve.

6. An assembly as recited in claim 2 wherein:
at least some of said grit particles are harder than either of (a) the interior surface of the sleeve and (b) the exterior surface of the mandrel.

7. An assembly as recited in claim 1 wherein:
said grit particles constitute 20-50 vol. % of the glue plus grit mixture.

8. An assembly as recited in claim 1 wherein:
said wire is adhered to the exterior surface of said mandrel by said glue means.

9. An assembly as recited in claim 1 wherein:
said wire is spirally wound around the exterior surface of said mandrel.

10. An assembly as recited in claim 9 wherein:
said cylindrical mandrel has opposite cylinder ends;
said exterior surface of the cylindrical mandrel is disposed between said opposite cylinder ends; and
said spirally wound wire has a pair of opposite wire ends each of which is adhered to a respective cylinder end by said glue means.

11. An assembly as recited in claim 1 wherein:
said sleeve has an inner diameter equal to the outside diameter of the mandrel plus two times the thickness of said wire, at ambient temperature.

12. An assembly as recited in claim 11 wherein:
said sleeve is substantially devoid of hoop stress due to said mandrel or said wire.

13. An assembly as recited in claim 11 wherein:
said glue means is adhesive at an elevated temperature below that required to thermally expand said metal sleeve to remove the sleeve from the mandrel.

14. A rolling mill roll assembly as recited in claim 1 wherein:
at least one of (a) the interior surface of said sleeve or (b) the exterior surface of said mandrel is roughened.

15. A rolling mill roll as recited in claim 14 wherein:
said roughened surface has a Ra. finish in the range 300-500 micro-inches.

16. An assembly as recited in claim 1 wherein:
said wire is wound around the exterior surface of said mandrel in a plurality of convolutions;
the spacing between adjacent convolutions being substantially greater than the thickness of said wire.

17. An assembly as recited in claim 1 wherein:
said wire is separate and discrete from and non-integral with said mandrel.

18. An assembly as recited in claim 1 wherein:
said wire is softer than the interior of said sleeve;
and said wire is very slightly flattened as a result of the shrink fitting of said sleeve on said wire.

19. A method for assembling a rolling mill roll assembly comprising an inner mandrel, an outer sleeve and wire wound around said inner mandrel and sandwiched between the mandrel and the sleeve, said method comprising the steps of:
providing a cylindrical, metal mandrel comprising an exterior cylindrical surface having a predetermined outer diameter;
providing a metal wire having a pair of opposite end portions and a predetermined thickness;
wrapping said wire around said exterior cylindrical surface of the mandrel and securing said wire to said mandrel;
applying glue around the exterior surface of the mandrel;
providing a cylindrical, metal sleeve having a predetermined inner diameter substantially equal to said outer diameter of the mandrel plus two times said thickness of the wire, at ambient temperature;
heating said sleeve to thermally expand its inner diameter; slipping said heated, expanded sleeve over the mandrel with
said wire wound therearound;
cooling said heated sleeve after said slipping step to contract said sleeve to its ambient diameter;
said wire being interposed between said mandrel and said sleeve to center the sleeve about the mandrel, as the sleeve undergoes cooling;
and adhering said contracted sleeve to said mandrel and said wire with said glue.

20. A method as recited in claim 19 wherein:
said step of providing said sleeve with said predetermined inner diameter at ambient temperature substantially avoids hoop stresses in said sleeve due to said mandrel or said wire during said contracting of said sleeve from its expanded diameter.

21. A method as recited in claim 19 and comprising:
providing a glue which is adhesive at an elevated temperature below that to which said thermally expanded sleeve has been heated when it is slipped over said mandrel.

22. A method as recited in claim 19 and comprising:
mixing grit particles with said glue before the sleeve is slipped over the mandrel.

23. A method as recited in claim 22 wherein:
at least some of said grit particles have a cross-sectional dimension greater than the thickness of said wire.

24. A method as recited in claim 22 wherein:
at least some of said grit particles become partially embedded in at least one of (a) the interior of said sleeve and (b) the exterior of said mandrel during the contracting of the sleeve.

25. A method as recited in claim 24 wherein:
at least some of said grit particles become embedded in both the interior of the sleeve and the exterior of the mandrel to enhance the bond therebetween effected by the glue.

26. A method as recited in claim 22 wherein:
at least some of said grit particles are harder than either of (a) the interior surface of the sleeve and (b) the exterior surface of the mandrel.

27. A method as recited in claim 22 wherein;
said grit particles constitute 20-50 vol. % of the glue plus grit mixture.

28. A method as recited in claim 19 and comprising:
damming said glue on the exterior surface of the mandrel with said wire during at least the contracting of said sleeve.

29. A method as recited in claim 19 wherein said wrapping step comprises:

spirally winding said wire around the exterior surface of said mandrel.

30. A method as recited in claim 19 herein:
said wire is secured to said mandrel with said 31. A method as recited in claim 19 and comprising:
roughening at least one of (a) the interior surface of said sleeve or (b) the exterior surface of said mandrel, before said wrapping step, in the case of said mandrel, or before said heating step, in the case of said sleeve.

* * * * *